(12) United States Patent
Kim

(10) Patent No.: US 6,400,655 B1
(45) Date of Patent: Jun. 4, 2002

(54) NEAR FIELD OPTICAL INFORMATION SYSTEM WITH SEPERATED RECORDING AND REPRODUCING INCLINED HEAD

(75) Inventor: Soo Kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/453,406

(22) Filed: Dec. 3, 1999

(30) Foreign Application Priority Data

Dec. 5, 1998 (KR) .............................. 98-53313

(51) Int. Cl.$^7$ ............................................... G11B 11/00
(52) U.S. Cl. ................. 369/13.33; 369/300; 369/44.23; 369/126; 250/234
(58) Field of Search ....................... 369/13, 126, 44.23, 369/112.23, 112.27, 13.39, 44.14, 112.01, 300, 44.22, 13.33; 250/221, 216, 306; 600/476, 478, 558; 347/256, 241, 238; 359/392, 393; 360/59

(56) References Cited

U.S. PATENT DOCUMENTS

| | | | | |
|---|---|---|---|---|
| 4,272,676 A | * | 6/1981 | Dieulesaint et al. | 250/221 |
| 5,284,149 A | * | 2/1994 | Dhadwal et al. | 600/476 |
| 5,638,111 A | * | 6/1997 | Hirokane et al. | 347/256 |
| 5,963,367 A | * | 10/1999 | Aksyuk et al. | 359/392 |
| 5,990,474 A | * | 11/1999 | Atia et al. | 250/234 |
| 6,011,664 A | * | 1/2000 | Kryder et al. | 360/59 |
| 6,172,945 B1 | * | 1/2001 | Hatam-Tabrizi | 369/13 |
| 6,215,114 B1 | * | 4/2001 | Yagi et al. | 250/216 |

* cited by examiner

*Primary Examiner*—David Hudspeth
*Assistant Examiner*—Kim-Kwok Chu
(74) *Attorney, Agent, or Firm*—Birch, Stewart, Kolasch & Birch, LLP

(57) ABSTRACT

A near field optical recording/reproducing head and a near field optical recording/reproducing apparatus using the head that are adaptive for writing an information onto a recording medium and reading out an information written on the recording medium by irradiating a near field light onto the recording medium and converting a near field light reflected the recording medium. In the near field optical recording/reproducing head, a first tip is floated by a minute height from the recording medium to focus an incident light onto the recording medium in a shape of near field light, and a second tip is floated by a minute height from the recording medium to convert a near field light reflected from the recording medium into an electrical signal. A mounting member supports the first and second tips with inclination and symmetrically. First and second minute displacement drivers move the first and second tips within a minute displacement in two-axis direction perpendicular to each other, respectively.

20 Claims, 9 Drawing Sheets

NEAR FIELD OPTICAL INFORMATION SYSTEM WITH SEPERATED RECORDING AND REPRODUCING INCLINED HEAD

BACKGROUND OF THE INVENTION

1. Field of the Invention

This invention relates to an apparatus of recording and reproducing a data onto/from a recording medium, and more particularly to a near field optical recording/reproducing head and a near field optical recording/reproducing apparatus employing the same that are adaptive for writing an information onto a recording medium or reading an information recorded on the recording medium by irradiating a near field light onto the recording medium and converting the near field light reflected from the recording medium into electrical signals.

2. Description of the Conventional Art

Generally, an information recording medium includes an optical recording medium or an opto-magnetic recording medium that is accessed by means of a far field optical system. As for the optical recording medium, there has been developed a DVD-RAM (digital versatile disc-random access memory) that is capable of recording at most 4.7 GB data larger than a recording capacity of a CD (compact disc) on a disc having a diameter of 120 mm. As for an opto-magnetic recording medium adopting the magnetic field modulation recording system, there has been suggested a standard for an advanced storage magneto optical (ASMO) device having a recording capacity of 6.1 GB level. There has been actively done a study for providing such information recording media having a high density in compliance with a high capacity of information such as a moving picture. However, the existent optical recording system or opto-magnetic recording system failed to arrive at a satisfying level of recording capacity due to its optical and physical limit. For instance, a DVD-RAM having a diameter of 120 mm and a recording capacity of 2.6 GB that is commercially available can not accommodate a picture with a resolution corresponding to a high density television, hereinafter referred to as "HDTV", more than two hours. Furthermore, a driving apparatus for the optical recording/reproducing system or the opto-magnetic recording/reproducing system has more and more serious vibration and noise as it goes into a higher multiple speed. As a result, it is difficult to operate the existent driving apparatus for the optical recording/reproducing system or opto-magnetic recording/reproducing system at a high speed beyond a certain limit so that a servo control can be performed.

In order to enlarge a recording capacity of a recording medium adopting the existent optical recording/reproducing system or opto-magnetic recording/reproducing system, a pit(or recording mark) size and a track width must become small to that extent. However, since the size of an optical spot for forming the pit or the mark can not be smaller than so-called "diffraction limit value", a limit exists in improving the recording density. In the case of a far field optical system, the size of an optical spot can not be smaller than a diffraction limit value proportional to λ/NA in which "λ" represents a wavelength of a light source and "NA" does a numerical aperture of an objective lens. In other words, to make a laser diode into a short wavelength and make an objective lens into a high numerical aperture, have encountered a physical limit. Accordingly, there has been done a study for shortening the wavelength λ or enlarging the numerical aperture NA so as to reduce the size of a light spot in the far field optical system. Nowadays, a blue laser with a wavelength of 450 nm has been commercially available, but it is basically impossible to reduce a light spot within the wavelength of a light.

In light of a trend toward a high density of an information, a novel optical recording/reproducing system able to overcome a limit in the recording/reproducing apparatus employing the current far field optical system is required. Accordingly, a growing interest has been taken in a near field optical recording/reproducing system utilizing a near field.

The near field optical recording/reproducing system is to record and reproduce information cells in hundreds of angstrom(Å) unit using a near field optics technology and a micro electro-mechanical system (MEMS) technology. Accordingly, the near field optical recording/reproducing system can improve the recording capacity dramatically in comparison to the existent optical recording/reproducing system or opto-magnetic recording/reproducing system. For instance, it is expected that, if a near field is used, then a HDTV level image data more than 20 Gbytes can be stored in one surface of a disc having a diameter of 3 cm. In this case, an image with a HDTV level resolution can be viewed for more than two hours at a picture quality of MPEG2 (moving picture experts group 2) with a sheet of disc with a diameter of 3 cm. Thus, when the near field is used, a recording medium can have a high capacity and an extremely small size. A data recording/reproducing apparatus of such a near field recording/reproducing system consists of a nano-scale of optical tip, and a system capable of driving the optical tip with a very high accuracy and at a high speed. The optical tip keeps a focus length within tens of nm from the recording medium to irradiate a near field light or an evanescent wave onto the recording medium, thereby forming a light spot into a micro size of tens of nm which is less than the wavelength of a light.

In the recording medium of near field optical recording/reproducing system as described above, a light spot has a micro size smaller than the wavelength of a light, so that pits and marks formed on the recording medium become small to that extent to record a high density of information. Since a light intensity is exponentially decayed as a light reflected from the recording medium becomes distant from the surface of the recording medium at the time of reproduction, the optical tip should keep a focus length of tens of nm from the recording medium likewise. During the reproduction, the optical tip receives a reflected light and converts the received reflected light into electrical signals. Since a near light signal can not be detected when the optical tip is a long distance from the recording medium and an intensity of the detected near light is reduced in inverse proportion to a distance between the tip and the recording medium, it is desirable that the tip comes into close to the recording medium as far as possible.

However, because the present study as to the near field optical recording/reproducing system stays at a principle level yet, improvements in many fields such as the servo control, the recording speed, the resolution, the convenience, the portability, the data transfer rate and so on are required. For instance, the conventional optical recording/reproducing system makes use of an actuator for driving the objective lens in two axis directions(i.e., tracking direction and focusing direction) to thereby carry out the tracking and focusing controls with a Lorenz force generated by a magnetic circuit of the actuator. However, a recording medium of near field optical recording/reproducing system can not make use of the existent actuator because pits and tracks are formed into a micro size smaller than an operation range of the actuator.

In other words, since the near field optical recording/ reproducing apparatus jumps tens to hundreds of tracks even in a minimum operation range of the actuator, it can not perform the tracking and focusing control by means of the existing actuator.

Accordingly, in order to implement the near field optical recording/reproducing apparatus, a development of a head driving device should be preceded such that the optical tip can keep a near-field distance from the recording medium and can access the recording medium at a random basis. Also, a light transfer device for transferring a light to the optical tip as well as a recording/reproducing signal processor is needed.

SUMMARY OF THE INVENTION

Accordingly, it is an object of the present invention to provide a near field recording/reproducing head that is adaptive for the near field recording and reproduction.

Further object of the present invention is to provide a disc driving apparatus that is adaptive for recording and reproducing a data on and from a recording medium accessed by a near field light.

Still further object of the present invention is to provide a near field optical recording/reproducing apparatus that is adaptive for recording or reproducing an information on and from a recording medium with a near field light.

In order to achieve these and other objects, a near field recording/reproducing head according to one aspect of the present invention includes a first tip for being floated by a near-field floating height from a recording medium to focus an incident light onto the recording medium in a shape of near field light; a second tip for being floating by a near-field floating height from the recording medium to convert a near field light reflected from the recording medium into an electrical signal; a mounting member for supporting the first and second tips with inclination and symmetrically; first near-field displacement driving means for moving the first tip within a near-field displacement in the two-axis direction perpendicular to each other; and second near-field displacement driving means for moving the second tip within a near-field displacement in the two-axis direction perpendicular to each other.

A near field optical recording/reproducing apparatus according to another aspect of the present invention includes rotation driving means for rotating a recording medium; a first tip for being floated by a near-field floating height from the recording medium to focus an incident light onto the recording medium in a shape of near field light; a second tip for being floating by a near-field floating height from the recording medium to convert a near field light reflected from the recording medium into an electrical signal; a slider mounted with the first and second tips with inclination and symmetrically; a loading beam for applying a desired load to the slider and for supporting the slider elastically; first near-field displacement driving means for moving the first tip within a near-field displacement in the two-axis direction perpendicular to each other; second near-field displacement driving means for moving the second tip within a near-field displacement in the two-axis direction perpendicular to each other; loading beam driving means for moving the loading beam by a large displacement width; a cartridge in which the recording medium is received, and in which the rotation driving means, the loading beam, the loading beam driving means, the first near-field displacement driving means and the second near-field displacement driving means are loaded; a light source for irradiating a light onto the first tip; a light source driving means for tracing the light source along the first tip; remote moving means for moving the loading beam by a large displacement on the recording medium; and signal-processing/reproducing means for signal-processing and reproducing a detected data from the recording medium using a head.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
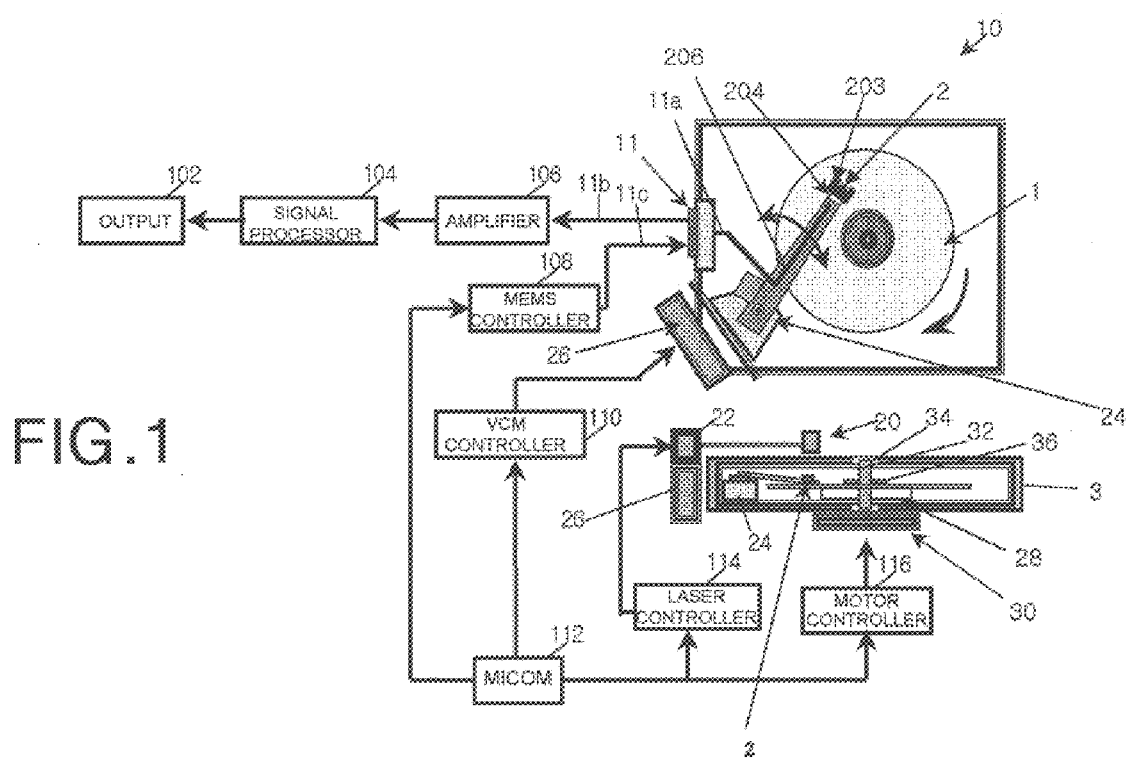
FIG. 1 is a block diagram showing the configuration of a near field recording/reproducing apparatus according to an embodiment of the present invention.

Referring to FIG. 1, there is shown a near field optical recording/reproducing apparatus according to an embodiment of the present invention. The near field optical recording/reproducing apparatus includes a laser diode 20 for generating a desired wavelength of laser beams, a head 2 for irradiating a near field light onto a disc 1 by incident laser beams to record an information and for receiving a near field light reflected from the disc 1 to convert it into electrical signals, and a cartridge 1 in which the disc 1 and the head 2 are received.

Figure 2:
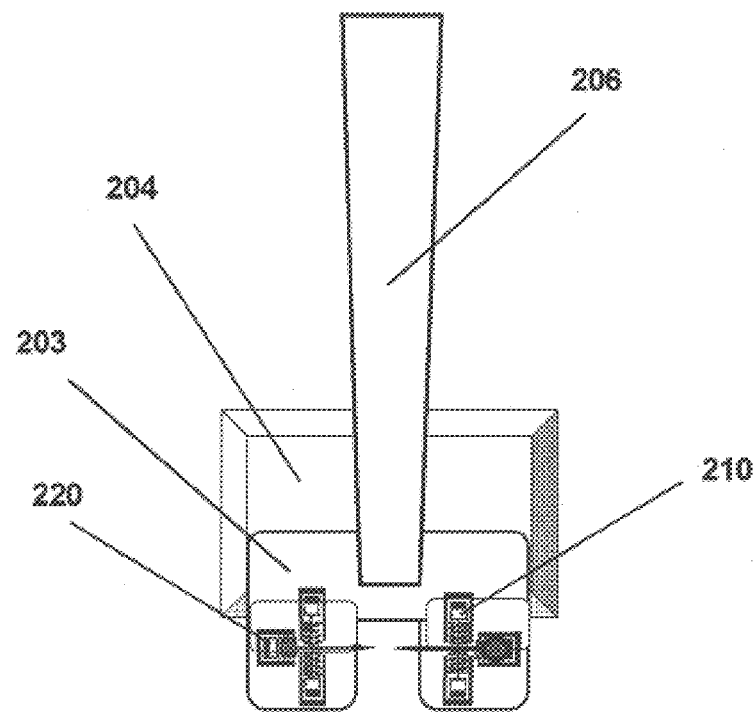
FIG. 2 is an enlarged plan view of the head, the head mount, the slider and the loading beam shown in FIG. 1.
Figure 3:
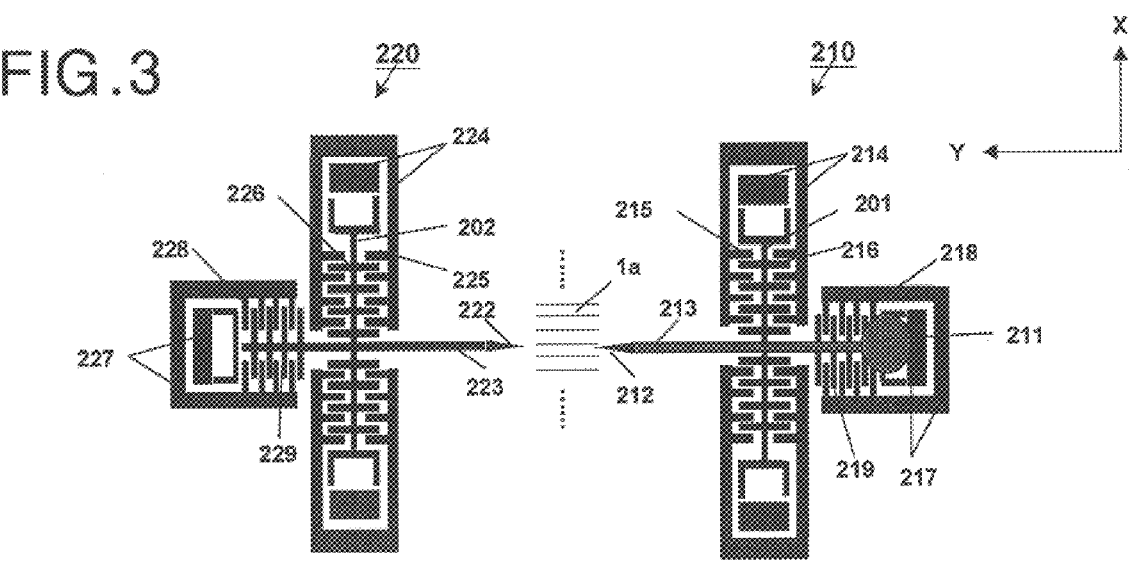
FIG. 3 is a detailed view of the head shown in FIG. 1.

The head 2 irradiates a near field light onto the recording surface of the disc 1 to form pits or recording marks having a size less than a wavelength of the light on the disc 1. Also, the head 2 receives a light reflected from the disc 1 and converts it into electrical signals. To this end, as shown in FIG. 2 and FIG. 3, the head 2 consists of a recording head 210 for irradiating a near field light on the disc 1 and a reproducing head 220 for receiving a near field light reflected from the disc to convert it electrical signals. The recording head 210 and the reproducing head 220 is manufactured by the MEMS technology to have a micro size and is driven in a near-field operation range. The laser diode 20 is installed on the upper plate of the cartridge 10 in opposition to the recording head 210 to irradiate a desired wavelength of laser beams onto the recording head 210.

As shown in FIG. 3, the recording head 210 includes a light-focusing part 211 for receiving a light from the laser diode 20, an optical fiber 213 extending from the light-focusing part 211, an optical fiber tip 212 formed at the end of the optical fiber 213, two transverse shafts 201 formed symmetrically at the center of the optical fiber 213, transverse wings 216 extending at a constant interval from the transverse shafts 201, transverse arms into which the transverse wings 216 are movably inserted, a transverse frame 214 to which the transverse arms 215 are secured, longitudinal wings 219 formed at the rear portion of the optical fiber 213 in a direction vertical to the optical fiber 213, longitudinal arms 218 into which the longitudinal wings 219 are movably inserted, and a longitudinal frame 217 to which the longitudinal arms 218 are secured. The light-focusing part 211 has such a relatively large area that it can easily focus a light irradiated from the laser diode 20. The light-focusing part 211 plays a role to focus a light irradiated from the laser diode 20 and to transfer it to the optical fiber 213 and the optical fiber tip 212. The optical fiber tip 212 is located at a near-field distance from the surface of the disc 1. The optical fiber tip 212 takes a cone-shape in which the top portion thereof is sharp-pointed such that near-field areas only can be irradiated at a recording film of the disc 1. A diameter of the sharp-pointed point defined at the end of the optical fiber tip 212 is approximately tens of nm to 100 nm. Such an optical fiber tip 212 converts laser beams incident to itself over the optical fiber 213 into a shape of near field light or a shape of evanescent wave and focuses it on the disc 1. In other words, the end of the optical fiber 212 takes a sharp-pointed shape to have a micro surface area, so that only the near field light or the evanescent wave less than the beam wavelength in the laser beams can be emitted toward the disc 1 while the reminder laser beams can not be emitted with being diffracted within the optical fiber tip 212. The near field light or the evanescent wave focused on the disc 1 from the optical fiber tip 212 forms a micro [minute] size of pits or recording marks. The transverse shaft 201, the transverse wings 216 and the longitudinal wings 219 are integral to the optical fiber 213. Those are a movable part operated along with the optical fiber 213 and the optical fiber tip 212. On the other hand, the transverse arms 215, the transverse frame 214, the longitudinal arms 218 and the longitudinal frame 217 are a stationary part in which the movable part is movably combined. Both the wings 216 and 219 and the arms 215 and 218 or any one of the wings 216 and 219 and the arms 215 and 218 are made from a piezoelectric material. If the arms 215 and 218 are made from a piezoelectric material, then the transverse arms 215 and the longitudinal arms 218 respond to a voltage signal inputted to themselves to make a two-axis driving of the movable part at a near-field displacement width. When a voltage is applied to the transverse arms 215, they are deformed in accordance with the polarity of the voltage to pull or draw the transverse wings 216. Then, the optical fiber tip 212 and the optical fiber 213 are linked to the transverse wings 216 to be linearly moved in a radial direction (i.e., X direction) with respect to the disc 1. At this time, a maximum displacement of the optical fiber tip 212 is equal to widths between the transverse arms 215 and the transverse wings 216. Widths between the transverse arms 215 and the transverse wings 216 are set to be similar to a width of a track 1a. If a voltage is applied to the longitudinal arms 218, the longitudinal arms are deformed in accordance with the polarity of the voltage to pull or draw the longitudinal wings 219. Then, the optical fiber tip 212 and the optical fiber 213 are linked to the longitudinal wings 219 to be linearly moved in a tangential direction (i.e., Y direction with respect to the disc 1. A maximum displacement of the optical fiber tip 212 in the tangential direction (i.e., Y direction) with respect to the disc 1 is equal to widths between the longitudinal arms 218 and the longitudinal wings 219.

As shown in FIG. 3, the reproducing head 220 includes an optical to electrical conversion tip 222 for converting a light reflected from the disc 1 into electrical signals, a longitudinal shaft 223 for supporting the optical to electrical conversion tip 222, a transverse shaft 202 formed symmetrically at the center of the longitudinal shaft 223 in a direction vertical to the longitudinal shaft 223, transverse wings 226 extending at a constant space from the transverse shaft 202, transverse arms 225 into which transverse wings are movably inserted, a transverse frame to which the transverse arms 225 are secured, longitudinal wings formed at the rear portion of the longitudinal shaft 223 in a direction vertical to the longitudinal shaft 223, longitudinal arms 228 into which the longitudinal wings 229 are movably inserted, and a longitudinal frame 227 to which the longitudinal arms 228 are secured. The optical to electrical conversion tip 222 receives a near field light reflected from the disc 1 after coming into close to the surface of the disc 1 to be focused from the optical fiber tip 212. The near field light incident to the optical to electrical conversion tip 222 is converted into electrical signals. To this end, the optical to electrical conversion tip 222 is formed of a cone-shaped photoelectric converting material (e.g., photo diode). A diameter of the sharp-pointed point defined at the end of the optical to electrical conversion tip 222 is approximately tens of nm to 100 nm such that near-field areas only can be sensed at the recording surface of the disc 1. The transverse shaft 202, the transverse wings 226 and the longitudinal wings 229 are integral to the longitudinal shaft 223. Those are a movable part operated along with the longitudinal shaft 223 and the optical to electrical conversion tip 222. On the other hand, the transverse arms 225, the transverse frame 224, the longitudinal arms 228 and the longitudinal frame 227 are a stationary part in which the movable part is movably combined. Both the wings 226 and 229 and the arms 225 and 228 or any one of the wings 226 and 229 and the arms 225 and 228 are made from a piezoelectric material. If the arms 225 and 228 are made from a piezoelectric material, then the transverse arms 225 and the longitudinal arms 228 respond to a voltage signal inputted to themselves to make a two-axis driving of the movable part at a near-field displacement width. When a voltage is applied to the transverse arms 225, they are deformed in accordance with the polarity of the voltage to pull or draw the transverse wings 226. Then, the optical to electrical conversion tip 222 and the longitudinal shaft 223 are linked to the transverse wings 226 to be linearly moved in a radial direction (i.e., X direction) with respect to the disc 1. At this time, a maximum displacement of the optical fiber tip 212 is equal to widths between the transverse arms 225 and the transverse wings 226. Widths between the transverse arms 225 and the transverse wings 226 are set to be similar to a width of a track 1a. If a voltage is applied to the longitudinal arms 228, the longitudinal arms 228 are deformed in accordance with the polarity of the voltage to pull or draw the longitudinal wings 229. Then, the optical to electrical conversion tip 222 and the longitudinal shaft 223 are linked to the longitudinal wings 229 to be linearly moved in a tangential direction (i.e., Y direction with respect to the disc 1. A maximum displacement of the optical fiber tip 212 in the tangential direction (i.e., Y direction) with respect to the disc 1 is equal to widths between the longitudinal arms 228 and the longitudinal wings 229.

Figure 4:
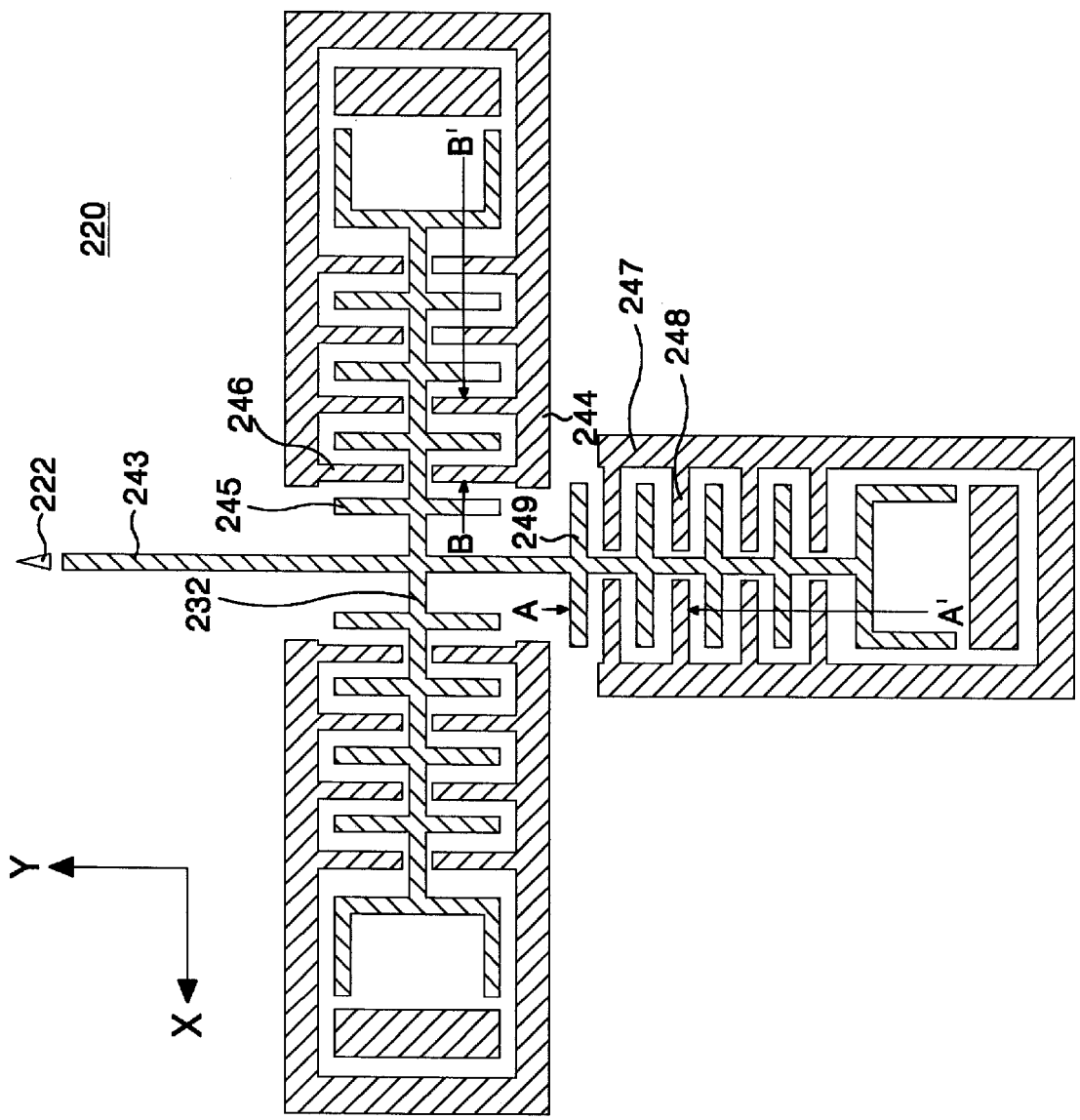
FIG. 4 represents another embodiment of the head shown in FIG. 1.

Meanwhile, the recording head 210 and the reproducing head 220 may be driven in accordance with a driving principle of an electrostatic actuator utilizing a static electricity as shown in FIG. 4.

Figure 5:
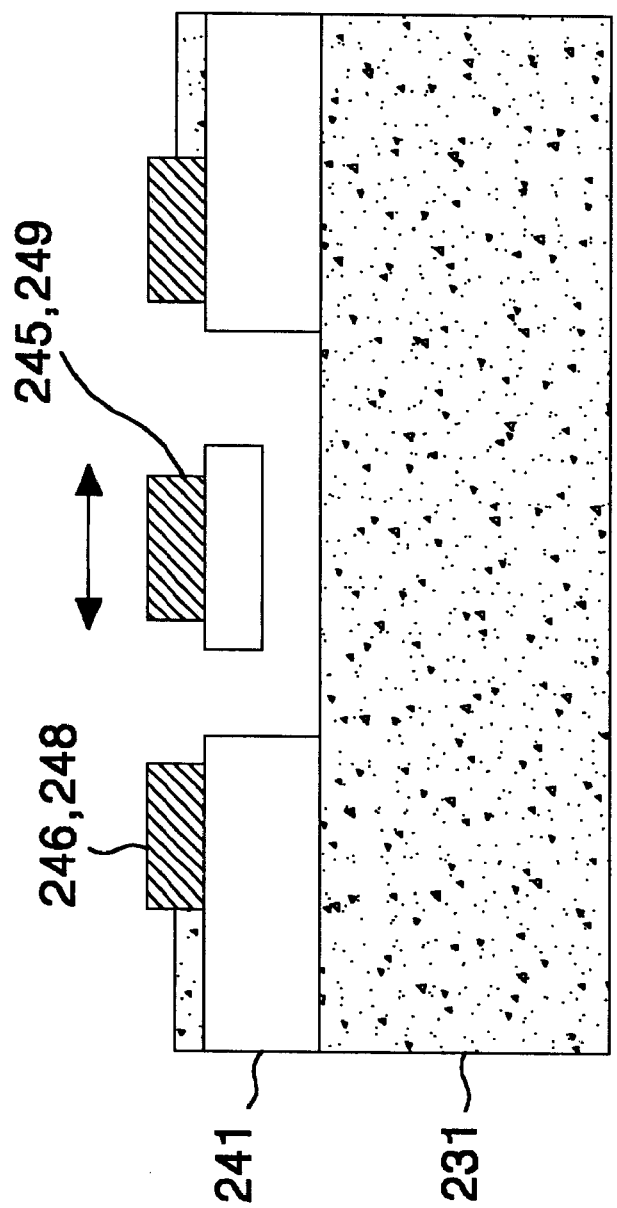
FIG. 5 is a sectional view taken along A–A' and B–B' lines in FIG. 4.

Referring now to FIG. 4 and FIG. 5, the reproducing head 220 includes an optical to electrical conversion tip 222 for converting a received near field light into electrical signals, a longitudinal shaft 243 and a transverse shaft 232 perpendicular to each other, transverse wings 245 formed at a constant space from the transverse shaft 232, transverse arms 246 into which the transverse wings 245 are movably inserted, a transverse frame 244 to which the transverse arms 246 are secured, longitudinal wings 249 formed at the longitudinal shaft 243, longitudinal arms 248 into which the longitudinal wings 249 are movably inserted, and a longitudinal frame 247 to which the longitudinal arms 248. The optical to electrical conversion tip 222 is substantially identical to that in FIG. 3. A movable part consists of the transverse shaft 232, the longitudinal shaft 243, the transverse wings 245 and the longitudinal wings 249 to move the optical to electrical conversion tip 222 in a radial direction (i.e., X direction) or a tangential direction (i.e., Y direction) with respect to the disc 1. As shown in FIG. 5, the transverse wings 245 and the longitudinal wings 249 included in the movable part keep a floating state over a semiconductor substrate 231. A stationary part consists of the transverse arms 246, the transverse frame 244, the longitudinal arms 248 and the longitudinal frame 247. The transverse arms 246 and the longitudinal arms 248 included in the stationary part are provided on the semiconductor substrate 231 with having the transverse wings 245 and the longitudinal wings 249 therebetween as shown in FIG. 5.

A manufacturing method of the reproducing head 220 in FIG. 4 will be described. First, a supporting layer 241 is entirely deposited on the semiconductor substrate 231. Material layers of the arms 246 and 248 and the wings 245 and 249 are entirely deposited on the supporting layer 241. Next, a mask pattern is formed on the arms 246 and 248 and the wings 245 and 249. A reactive ion etching (RIE) is performed on the semiconductor substrate 231 formed with the mask pattern. At this time, the arms 246 and 248 and the wings 245 and 249 are patterned. Finally, the supporting layer 241 under the wings 245 and 249 is removed by the etching such that the wings 245 and 249 are floated over the semiconductor substrate 231.

If an electrical field is applied between the arms 246 and 248 and the wings 245 and 249 structured as described above, then a static electricity is generated between the arms 246 and 248 and the wings 245 and 249 by a potential difference. By this static electricity, the arms 246 and 248 and the wings 245 and 249 are mutually attracted or repulsed. Then, the wings 245 and 249 are linearly moved toward the arms 246 and 248, so that the optical to electrical conversion tip 222 is linked to the wings 245 and 249 to be linearly moved in a radial direction (i.e., X direction) or a tangential direction (i.e., Y direction) with respect to the disc 1.

In a similar manner to the reproducing head 220, the recording head 210 also can be driven with a driving force caused by a static electricity.

The operational state of the recording head 210, the reproducing head 220 and the laser diode 20 in a recording mode or in a reproduction mode is indicated in the following table:

TABLE 1

|  | Reproducing Head | Recording Head | Power of Laser Diode |
| --- | --- | --- | --- |
| Recording Mode | Disable | Enable | Large |
| Reproduction Mode | Enable | Enable | Small |

Figure 6:
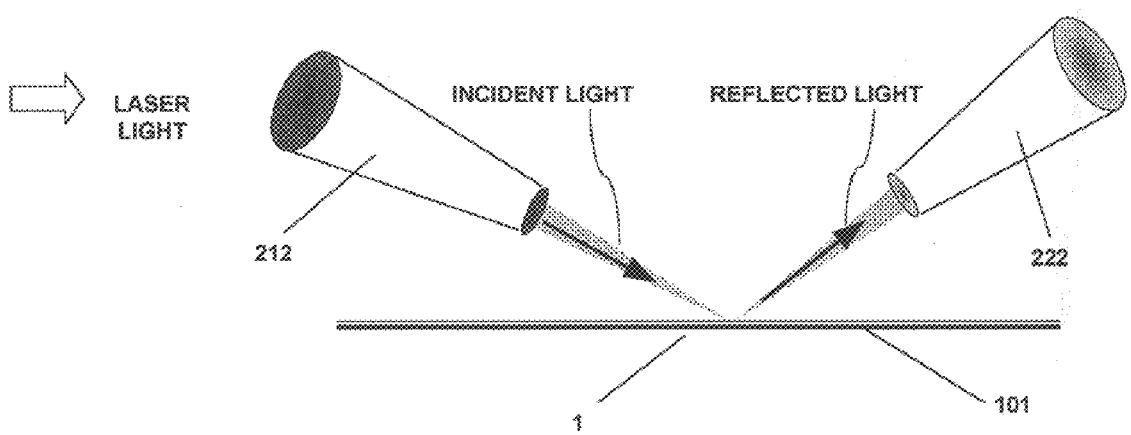
FIG. 6 represents a near field light irradiated from the head in FIG. 2 and a near field light incident to the head.

Referring to Table 1 and FIG. 6, both the reproducing head 220 and the recording head 210 are enabled in the reproduction mode. At this time, a light generated from the laser diode 20 has a low light power suitable for the reproduction. Such a reproducing light transmits the upper plate of a cartridge 10 to be focused on the focusing part 211 of the recording head 210. A light incident to the focusing part 211 is transferred to the optical fiber tip 212 over the optical fiber 213. The optical fiber tip 212 converts a reproducing light incident to itself into a near field light and irradiates it on the recording film 101 of the disc 1. A near field light incident to the disc 1 is reflected toward the reproducing head 220 and then is incident to the optical to electrical conversion tip 222. The optical to electrical conversion tip 222 converts the incident near field light into electrical signals. If the near field light is focused on the recording film 101, then the disc 1 is changed from a crystalline state into an amorphous state to form pits or recording marks. At this time, the reflectivity of a light becomes different due to a change in a crystalline structure.

In the recording mode, the recording head 210 only is enabled. At this time, a light generated from the laser diode 20 has such a high light power that pits or recording marks can be formed on the recording film 101. Such a recording light is converted into a near field light shape by means of the optical fiber tip 212 to form a micro size of pits or recording marks on the recording film 101 of the disc 10.

Meanwhile, the upper plate 3 of the cartridge 10 is made from a transparent light transmissive material such that a light generated from the laser diode 20 can be focused on the focusing part 110 of the recording head 210. To this end, the upper plate 3 of the cartridge 10 is formed of a transparent light transmissive material such as glass, polycarbonate and PMMC, etc.

Figure 7:
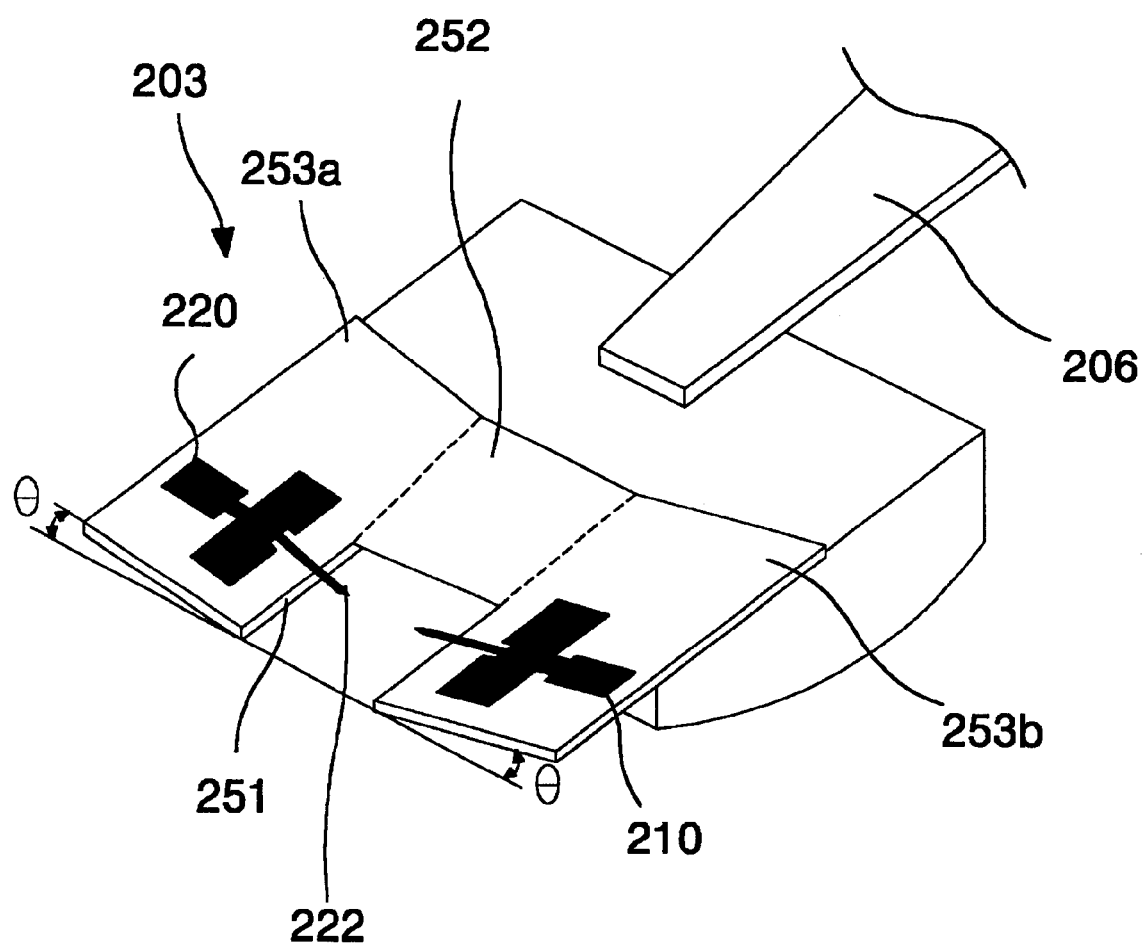
FIG. 7 is a detailed perspective view of a flange for supporting the head in FIG. 2.
Figure 8:
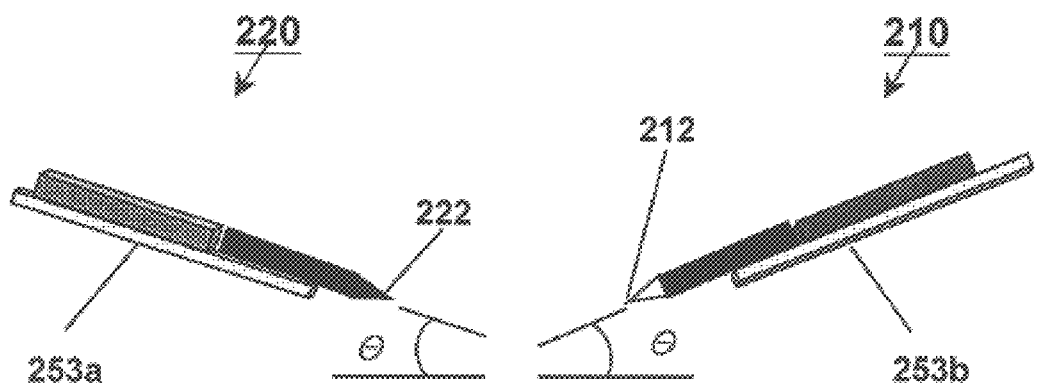
FIG. 8 is a sectional view showing an angle of inclination at the head in FIG. 2.
Figure 9:
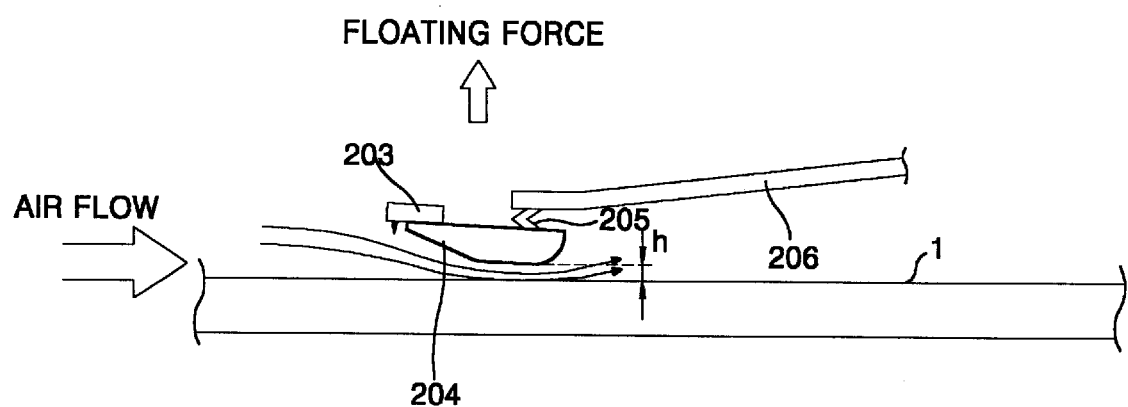
FIG. 9 is a sectional view showing operations of the slider and the loading beam in FIG. 2.

Referring now to FIG. 2 and FIG. 7, a head 2 in the near field optical recording/reproducing apparatus includes a head mount 203, a slider 204 for supporting the head mount 203, and a loading beam 206 for elastically supporting the slider 204. The head mount 203 includes a flat plate 252, and head supporting plates 253a and 253b hinged at an angle of θ at each side of the flat plate 252. The flat plate 252 is bonded to the upper surface of the slider 204. At the front portion of the flat plate 252, a guide hole 251 cut in a square shape is defined. The guide hole 251 provides a light path such that the head mount 203 can not make an interference with a near field light irradiated from the optical fiber tip 212 and a reflected light incident to the optical to electrical conversion tip 222. Flanges 253a and 253b support the recording head 210 and the reproducing head 220, respectively in such a manner that the light fiber tip 212 and the optical to electrical conversion tip 222 are opposed to each other on the same track 1a. The flanges 253a and 253b play a role to support the optical fiber tip 212 and the optical to electrical conversion tip 222 with inclination in such a manner that the optical fiber tip 212 and the optical to electrical conversion tip 222 look out on a specified position on the disc 1 without a curve. By this flange 253b, the optical fiber tip 212 looks out on the disc 1 so that a near field light can be irradiated onto the disc 1 without deteriorating the light efficiency. Likewise, the optical to electrical conversion tip 220 can stabbly receive a near field light reflected from the disc 1 with the aid of the flange 253a. In other words, as shown in FIG. 8, the optical fiber tip 212 and the optical to electrical conversion tip 222 allows a near field light to be irradiated onto the disc 1 with a maximum light efficiency, and are opposed with inclination to each other with the aid of the flanges 253a and 253b at an angle of θ such that most near field light reflected from the disc 1 can be received. The slider 204 and the loading beam 206 are responsible for controlling a floating height of the head 31 within a near-field height so that the recording head 210 and the reproducing head 220 can keep the near-field height from the surface of the disc 1 at the time of rotating the disc 1 to thereby access the disc 1. Between the slider 204 and the loading beam 206, as shown in FIG. 9, a gimbal 205 for transferring a load of the loading beam 206 to the slider 204 is provided. Upon the focusing control, a height of the head 2 is kept constantly at a near-field height by an air flow generated during a rotation of the disc 1 and a load applied to the slider 204. When the disc 1 begins to rotate, a flux is generated on the surface of the disc 1. An air flow caused by the flux results in a floating force of the slider 204. Then, the slider 204 floats from the surface of the disc 1 the instant that it overcomes a load to apply from the loading beam 206 and a load itself. If the disc 1 is rotated at a constant speed, then an amount of the air flow becomes constant to keep a constant floating height h. At this time, the slider 204 runs on the surface of the disc 1 with the aid of an air bearing caused by the air flow. Herein, an application load of the loading beam 206 is set to make a floating height h of tens [of] to hundreds of nm.

As shown in FIG. 1, a movable part 24 of a VCM motor for pivoting the head beam 206, a rotor part 28 of a spindle motor for rotating the disc 1 and an input/output terminal connected, via an internal signal line 11a, to the head and connected to external signal lines 11b and 11c selectively to apply a servo signal from the exterior to a driver of the head 2 are provided within the cartridge 10. The disc 1, the rotor part 28 of the spindle motor and the movable part of the VCM motor, etc. are provided within the cartridge 10 as described above, so that the configuration of a disc driver within an information equipment can be simplified and thinned. The movable part 24 of the VCM motor consists of a permanent magnet and a yoke for generating a magnetic flux. The movable part 24 of the VCM motor is responsible for being remotely controlled at the exterior of the cartridge 10 to pivot the loading beam 206. The movable part 24 of the VCM motor is installed at the side wall cut out with inclination from a cartridge housing 3. The movable part 24 of the VCM motor faces the stationary part 26 of the VCM motor installed at the exterior of the cartridge 10. The stationary part 26 of the VCM motor consists of a coil and a core. When a current is applied to the coil of the stationary part 26 of the VCM motor, a magnetic circuit for generating a driving force is formed between the permanent magnet of the movable part 24 and the coil. The loading beam 206 is pivoted with a driving force generated from the magnetic circuit between the movable part 24 and the stationary part 26 of the VCM motor. When the loading beam 206 is pivoted, the slider 204 and the head 2 are moved toward the inner circumference or the outer circumference of the disc 1. In other words, the movable part 24 allows the head 2 to jump tens of to hundreds of tracks 1a at the time of retrieving a data like a sled servo in the conventional optical recording/reproducing system. The rotor part 28 of the spindle motor is put into a rotation axis 32 loaded with the disc 1 and installed between the upper plate and the lower plate of the cartridge 10. The rotation axis 32 goes through a center hole of the disc 1 and is inserted into a bearing 34 installed at the upper and lower plates of the cartridge 10. On the disc 1, a clamper 36 for securing the disc 1 to the rotor part 28 of the spindle motor is provided. The clamper 36 is made in a shape of annular ring and is inserted into the rotation axis 32 at the upper surface of the disc 1. The rotor part 28 of the spindle motor faces a stationary part 30 of the spindle motor installed under the cartridge 10 with having the lower plate of the cartridge 10 therebetween. The stationary part 30 of the spindle motor is formed of a coil wound around the core. A magnetic circuit is formed by the coil and the permanent magnet included in the rotor part 28 to generate a rotating force. At this time, since the disc 1 and the rotation axis 32 are rotated in a single body to coincide the center of the rotation axis 32 with the rotating axis center of the disc 1, they can be rotated without a vibration even upon high-speed rotation thereof.

Such a cartridge 10 has an interior sealed in a vacuum state to keep an airtight structure. Thus, dust, a particle and the like flowing from the exterior into the disc 1 are drastically shut off. Accordingly, an optical error caused by a contamination such as dust or a particle can be prevented. In other words, if the surface of the disc 1 is contaminated by an alien substance such as dust, then a light incident to the disc 1 is absorbed or reflected by the alien substance to generate an aberration. Such an optical aberration results in the light efficiency being deteriorated and the jitter of a signal being enlarged. Particularly, since the size of track pitches and pits or recording marks are more and more reduced as the disc 1 goes toward a higher density, an optical error caused by an alien substance such as dust or particle, etc. on the light path are increased. According to the present invention, the cartridge 10 is shielded from an exterior contamination source, so that an optical error caused by dust, etc. can be prevented.

Returning to FIG. 1, the near field light recording/reproducing apparatus according to an embodiment of the present invention includes a light source driving movable part 22 for moving the laser diode 20, a laser controller 114 for controlling the light source driving movable part 22, a VCM controller 110 for remotely controlling the VCM motor, a MEMS controller 108 for controlling the head 2 within a near-field displacement width, an amplifier 106, a signal processor 104 and an output 102 which are connected, in series, to the input/output terminal 11 to detect a reproducing signal, a motor controller 116 for controlling the spindle motor remotely, and a micro control unit connected commonly to the VCM controller 110, the MEMS controller 108 and the laser controller 114 to control them. In FIG. 1, the light source 20, the light source driving movable part 22, the stationary part 26 of the VCM motor, the stationary part 30 of the spindle motor, the output 102, the signal processor 104, and the amplifier 106, the MEMS controller 108, the VCM controller 110, the micro control unit 12, the laser controller 114 and the motor controller 116 are installed at a disc driver within an information equipment. Herein, the light source 20, the light source driving movable part 22, the stationary part 26 of the VCM motor and the stationary part 30 of the spindle motor are adjacent to a cartridge receiver of the disc driver, whereas the output 102, the signal processor 104, the amplifier 106, the MEMS controller 108, the VCM controller 110, the micro control unit 112, the laser controller 114 and the motor controller 116 are mounted in a shape of chip on a print circuit board within the disc driver. The light source driving movable part 22 is installed adjacently over the stationary part 26 of the VCM motor. The light source driving movable part 22 includes an electro-magnet magnetized in accordance with a current signal, and a signal transmitter for delivering a current signal from the laser controller 114 to the laser diode 20. Such a light source driving movable part 22 is rotated by being magnetized under control of the laser controller 114 to generate a magnetic flux linking the coil included in the stationary part 26 of the VCM motor, and radiates the laser diode 20 by applying a current signal from the laser controller 114 to the laser diode 20. Accordingly, the laser diode 20 is radiated by the stationary part 26 of the VCM motor to trace the focusing part 211 of the recording head 210. The laser controller 114 rotates the light source driving movable part 22 under control of the micro control unit 112 and, at the same time, radiates the laser diode 20 at a different light power in accordance with the recording mode and the reproduction mode. The VCM controller 110 is connected to the stationary part 26 of the VCM motor to apply a current signal to the coil included in the stationary part 26 of the VCM motor under control of the micro control unit 112. The VCM controller 110 controls the VCM motor in which the movable part 24 and the stationary part 26 are separated with having the cartridge therebetween, thereby moving the loading beam 206 in the radial direction with respect to the disc 1.

The MEMS controller 108 is connected to an input terminal of the input/output terminal 11 to apply a voltage signal to the arms 215 and 218 and the wings 216 and 219 of the recording head 210 in accordance with a servo signal, thereby making a two-axis driving of the movable part of the recording head 210. Also, the MEMS controller 108 applies a voltage signal to the arms 225 and 228 and the wings 226 and 229 of the reproducing head 220 to make a two-axis driving of the movable part of the reproducing head 220. The movable parts of the recording head 210 and the reproducing head 220 are moved in the radial direction or the tangential direction with respect to the disc 1 in accordance with a servo signal applied from the MEMS controller 108 to thereby trace the center of the track 1a. The amplifier 106 is connected to the output terminal of the input/output terminal 11 to amplify a signal from the reproducing head 220 and apply the same to the signal processor 104. The signal processor 104 decodes a signal from the amplifier 102 to reconstruct it and, at the same time, carries out an error correction and applies the same to the output 102. The output 102 converts a reproducing signal from the signal processor 104 in an analog signal, and applies the same to a display or a speaker (not shown).

As described above, the head according to the present invention is provided with the head including the recording head and the reproducing head with a sharp-pointed portion of tens to hundreds of nm, the near-field displacement driving device for driving the heads slightly so as to make a tracking control with the near-field tracking width, and the slider and the loading beam for controlling the height of the heads within a desired height, so that it is adaptive for recording and reproducing a data onto and from a high density recording medium in which a nano scale of recording marks and track widths are formed. The disc driving apparatus according to the present invention has the rotor part of the spindle motor for rotating a disc and the movable part of the VCM motor for driving the head installed within the cartridge to clamp the disc stabbly at the time of rotating the disc, thereby minimizing a vibration as well as shutting off a particle or dust, etc. flowing from the exterior such that it is adaptive for recording and reproducing the high density recording medium. The near field light recording/reproducing apparatus irradiates a near field light by floating from the disc by a near-field floating height and senses a near field light reflected from the disc, and moves the head by a near-field displacement and moves it by a relatively large displacement to control the head such that the recording surface of the disc is accessed on a random basis, so that it is adaptive for recording and reproducing a data onto and from the high density recording medium.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A separated near field recording/reproducing inclined head comprising:

a first tip for being floated by a near-field floating height from a recording medium to focus an incident light onto the recording medium in a shape of a near field light;

a second tip for being floated by the near-field floating height from the recording medium to convert a near field light reflected from the recording medium into an electrical signal;

a mounting member for supporting the first and second tips with inclination and symmetry;

first near-field displacement driving means for selectively moving the first tip within a near-field displacement in a two-axis direction perpendicular to each other; and second near-field displacement driving means for selectively moving the second tip within a near-field displacement in a two-axis direction perpendicular to each other.

2. The separated near field recording/reproducing inclined head according to claim 1, wherein the ends of the first and second tips are shaped with a cone, and a diameter of the sharp-pointed portion in the cone is within tens or hundreds of nm.

3. The separated near field recording/reproducing inclined head according to claim 1, wherein the first tip is provided at the end of an optical fiber.

4. The separated near field recording/reproducing inclined head according to claim 1, wherein the mounting member comprises:

a flat plate part defined with a guide hole for providing paths of a near field light focusing from the first tip onto the recording medium and a near field light reflected from the recording medium into the second tip; and an inclined part, being hinged upwardly at a desired angle from the flat plate part, to support each of the first and second tips at a desired inclination angle with respect to the recording medium.

5. A separated near field recording/reproducing inclined head comprising:

a first tip for being floated by a near-field floating height from a recording medium to focus an incident light onto the recording medium in a shape of a near field light;

a second tip for being floated by the near-field floating height from the recording medium to convert a near field light reflected from the recording medium into an electrical signal;

a mounting member for supporting the first and second tips with inclination and symmetry;

first near-field displacement driving means for moving the first tip within a near-field displacement in a two-axis direction perpendicular to each other; and second near-field displacement driving means for moving the second tip within a near-field displacement in a two-axis direction perpendicular to each other, wherein the second tip is made from a photoelectric conversion material.

6. The separated near field recording/reproducing inclined head according to claim 5, wherein the first and second near-field displacement driving means are made from a piezoelectric material, and respond to a voltage signal applied to themselves to move the first and second tips in the two-axis direction.

7. A separated near field recording/reproducing inclined head comprising:
  a first tip for being floated by a near-field floating height from a recording medium to focus an incident light onto the recording medium in a shape of a near field light;
  a second tip for being floated by the near-field floating height from the recording medium to convert a near field light reflected from the recording medium into an electrical signal;
  a mounting member for supporting the first and second tips with inclination and symmetry;
  an optical fiber provided with the first tip;
  a transverse shaft formed on the optical fiber in a direction perpendicular to the optical fiber;
  a plurality of longitudinal wings formed with a desired space on the optical fiber;
  a plurality of longitudinal arms, being inserted between the longitudinal wings, to move the longitudinal wings;
  a longitudinal frame secured to the longitudinal arms;
  a plurality of transverse wings formed with a desired space on the transverse shaft;
  a plurality of transverse wings, being inserted between the transverse wings, to move the transverse wings;
  a transverse frame secured to the transverse arms; and
  near-field displacement driving means for moving the second tip within a near-field displacement in a two-axis direction perpendicular to each other.

8. A separated near field recording/reproducing inclined head comprising:
  a first tip for being floated by a near-field floating height from a recording medium to focus an incident light onto the recording medium in a shape of a near field light;
  a second tip for being floated by the near-field floating height from the recording medium to convert a near field light reflected from the recording medium into an electrical signal;
  a mounting member for supporting the first and second tips with inclination and symmetry;
  first near-field displacement driving means for moving the first tip within a near-field displacement in a two-axis direction perpendicular to each other;
  a longitudinal shaft provided with the second tip;
  a transverse shaft formed on the longitudinal shaft in a direction perpendicular to the longitudinal shaft;
  a plurality of longitudinal wings formed with a desired space on the optical fiber;
  a plurality of longitudinal arms, being inserted between the longitudinal wings, to move the longitudinal wings;
  a longitudinal frame secured to the longitudinal arms;
  a plurality of transverse wings formed with a desired space on the transverse axis;
  a plurality of transverse wings, being inserted between the transverse wings, to move the transverse wings; and
  a transverse frame secured to the transverse arms.

9. A near field optical information system, comprising:
  rotation driving means for rotating a recording medium;
  a first tip for being floated by a near-field floating height from the recording medium to focus an incident light onto the recording medium in a shape of a near field light;
  a second tip for being floated by the near-field floating height from the recording medium to convert a near field light reflected from the recording medium into an electrical signal;
  a slider mounted with the first and second tips with inclination and symmetry;
  a loading beam for applying a desired load to the slider and for supporting the slider elastically;
  first near-field displacement driving means for moving the first tip within a near-field displacement in a two-axis direction perpendicular to each other;
  second near-field displacement driving means for moving the second tip within a near-field displacement in a two-axis direction perpendicular to each other;
  loading beam driving means for moving the loading beam by a large displacement width;
  a cartridge in which the recording medium is received, and in which the rotation driving means, the loading beam, the loading beam driving means, the first near-field displacement driving means and the second near-field displacement driving means are contained;
  a light source for irradiating a light onto the first tip;
  light source driving means for tracing the light source along the first tip;
  remote moving means for moving the loading beam by a large displacement on the recording medium; and
  signal-processing/reproducing means for signal-processing and reproducing a detected data from the recording medium.

10. The near field optical information system according to claim 9, further comprising:
  an input/output terminal, being installed on the cartridge, to transmit a detected data from the recording medium to the exterior and to transmit a signal applied from the exterior to the first and second near-field displacement driving means.

11. The near field optical information system according to claim 9, wherein the rotation driving means further comprises:
  a rotation axis inserted into the recording medium; and
  a permanent magnet into which the rotation axis is pressed and to which the recording medium is secured, to generate a magnetic flux.

12. The near field optical information system according to claim 9, further comprising:
  a remote control means installed at the outside of the cartridge to control the rotation driving means remotely.

13. The near field optical information system according to claim 12, wherein the remote control means comprises:
  a coil; and
  a core wound with the coil.

14. A near field optical information system, comprising:
  a rotation driving means for rotating a recording medium;
  a first tip for being floated by a near-field floating height from the recording medium to focus an incident light onto the recording medium in a shape of a near field light;
  a second tip for being floated by the near-field floating height from the recording medium to convert a near field light reflected from the recording medium into an electrical signal;
  a slider mounted with the first and second tips with inclination and symmetry;
  a loading beam for applying a desired load to the slider and for supporting the slider elastically;
  first near-field displacement driving means for moving the first tip within a near-field displacement in a two-axis direction perpendicular to each other;

second near-field displacement driving means for moving the second tip within a near-field displacement in a two-axis direction perpendicular to each other;

loading beam driving means for moving the loading beam by a large displacement width;

a cartridge in which the recording medium is received, and in which the rotation driving means, the loading beam, the loading beam driving means, the first near-field displacement driving means and the second near-field displacement driving means are contained;

a light source for irradiating a light onto the first tip;

light source driving means for tracing the light source along the first tip;

remote moving means for moving the loading beam by a large displacement on the recording medium; and signal-processing/reproducing means for signal-processing and reproducing a detected data from the recording medium;

wherein the cartridge is sealed in such a manner that the inside of thereof keeps a vacuum state, and an upper plate of the cartridge is made from a light transmissive material.

15. The near field optical information system according to claim 14, wherein the rotation driving means further comprises:

a rotor part integral to the recording medium; and a stationary part separated from the rotor part to rotate the rotor part.

16. The near field optical information system according to claim 14, wherein the remote moving means further comprises:

a movable part in which the loading beam is pivotally installed; and a stationary part separated from the movable part.

17. A near field optical information system, comprising:

a rotation driving means for rotating a recording medium;

a first tip for being floated by a near-field floating height from the recording medium to focus an incident light onto the recording medium in a shape of a near field light;

a second tip for being floated by the near-field floating height from the recording medium to convert a near field light reflected from the recording medium into an electrical signal;

a slider mounted with the first and second tips with inclination and symmetry;

a loading beam for applying a desired load to the slider and for supporting the slider elastically;

first near-field displacement driving means for moving the first tip within a near-field displacement in a two-axis direction perpendicular to each other;

second near-field displacement driving means for moving the second tip within a near-field displacement in a two-axis direction perpendicular to each other;

loading beam driving means for moving the loading beam by a large displacement width;

a light source for irradiating a light onto the first tip;

light source driving means for tracing the light source along the first tip;

remote moving means for moving the loading beam by a large displacement on the recording medium;

a cartridge with an inclined part provided on the side wall between the loading beam driving means and the remote moving means such that the loading beam driving means faces the remote moving means, in which the recording medium is received, and in which the rotation driving means, the slider, the loading beam, the loading beam driving means, the first near-field displacement driving means and the second near-field displacement driving means are contained; and signal-processing/reproducing means for signal-processing and reproducing a detected data from the recording medium.

18. The near field optical information system according to claim 17, wherein the rotation driving means further comprises:

a rotor part integral to the recording medium; and a stationary part separated from the rotor part to rotate the rotor part.

19. The near field optical information system according to claim 17, wherein the remote moving means further comprises:

a movable part in which the loading beam is pivotally installed; and a stationary part separated from the movable part.

20. A near field optical information system, comprising:

a rotation driving means for rotating a recording medium;

a first tip for being floated by a near-field floating height from the recording medium to focus an incident light onto the recording medium in a shape of a near field light;

a second tip for being floated by the near-field floating height from the recording medium to convert a near field light reflected from the recording medium into an electrical signal;

a slider mounted with the first and second tips with inclination and symmetry;

a loading beam for applying a desired load to the slider and for supporting the slider elastically;

first near-field displacement driving means for moving the first tip within a near-field displacement in a two-axis direction perpendicular to each other;

second near-field displacement driving means for moving the second tip within a near-field displacement in a two-axis direction perpendicular to each other;

loading beam driving means for moving the loading beam by a large displacement width;

a cartridge in which the recording medium is received, and in which the rotation driving means, the loading beam, the loading beam driving means, the first near-field displacement driving means and the second near-field displacement driving means are contained;

a light source for irradiating a light onto the first tip;

light source driving means for tracing the light source along the first tip in accordance with a rotation force;

a magnetic circuit along with a remote moving means to pivot the light source and for generating the rotation force;

the remote moving means for moving the loading beam by a large displacement on the recording medium; and signal-processing/reproducing means for signal-processing and reproducing a detected data from the recording medium.

* * * * *